United States Patent Office 2,964,258
Patented Dec. 13, 1960

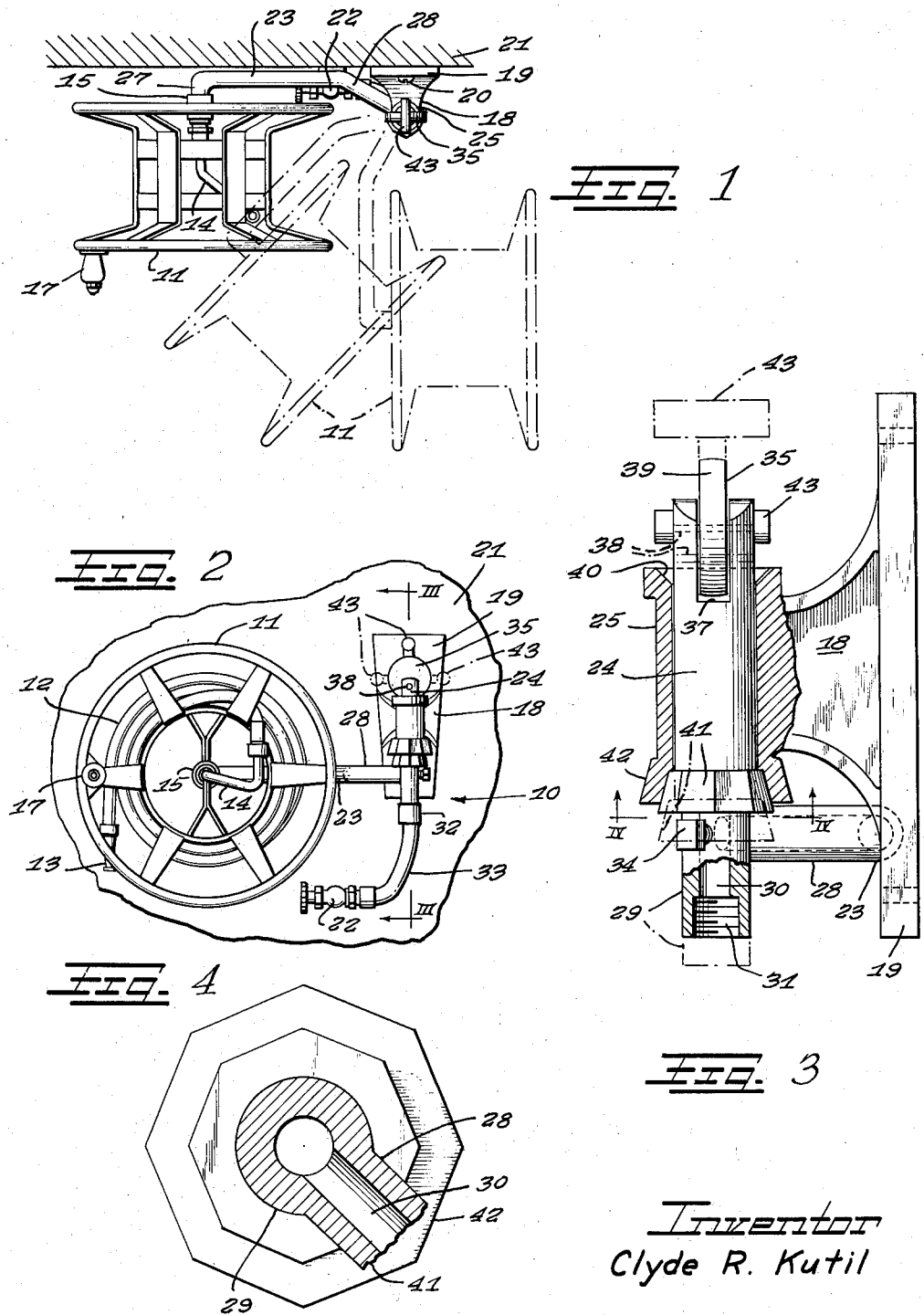
Dec. 13, 1960   C. R. KUTIL   2,964,258
REELING ADJUSTMENT MEANS FOR HOSE REELS AND THE LIKE
Filed Oct. 13, 1958   2 Sheets-Sheet 1
Inventor
Clyde R. Kutil

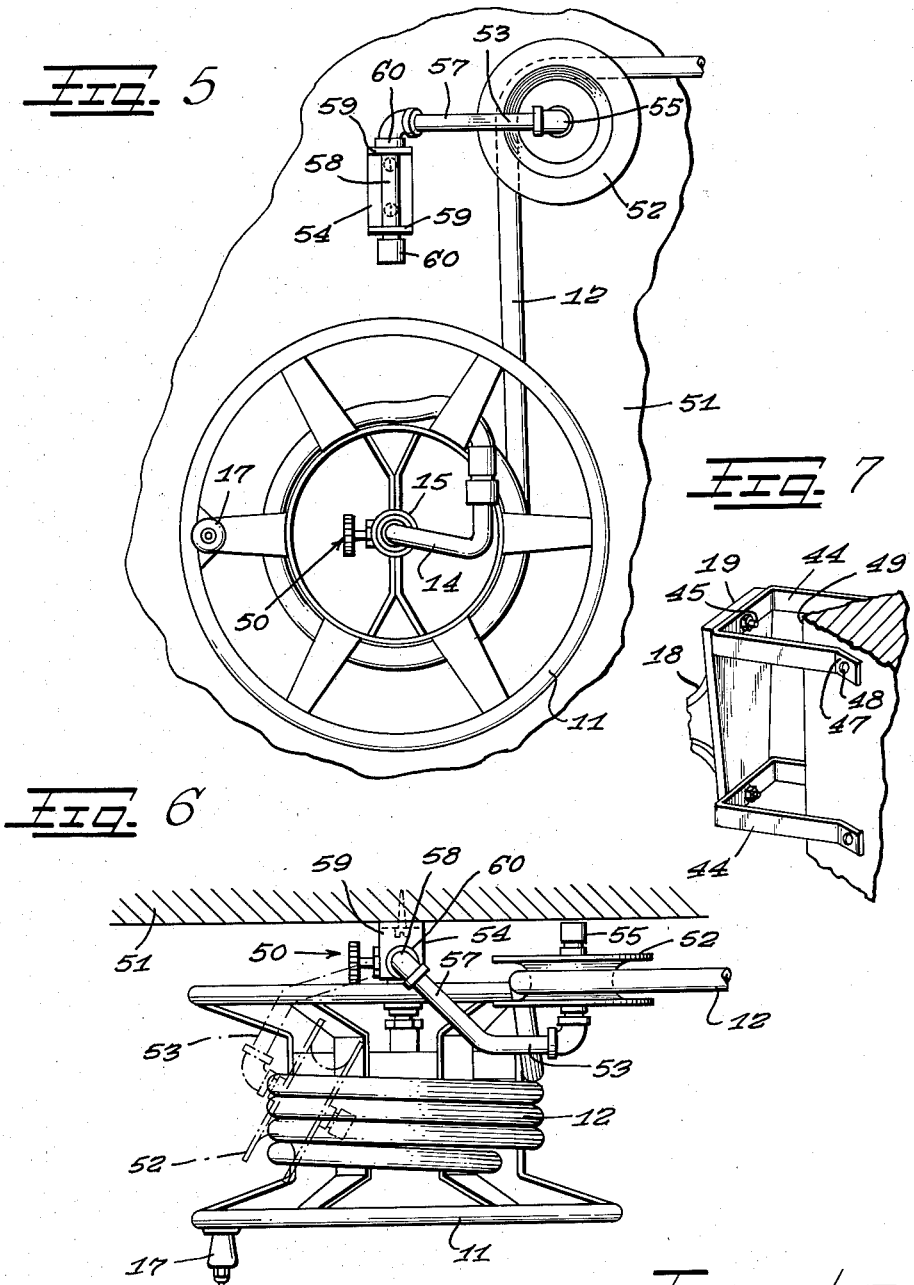

2,964,258

REELING ADJUSTMENT MEANS FOR HOSE REELS AND THE LIKE

Clyde R. Kutil, 2521 Budd St., River Grove, Ill.

Filed Oct. 13, 1958, Ser. No. 766,986

4 Claims. (Cl. 242—106)

The present invention relates to improvements in means for facilitating the reeling out and reeling in of especially garden hose and more particularly with respect to reels of the direct fluid connection type.

When drawing hose from a reel, the direction of the pull may vary through a substantial arc about a vertical axis while the axis of the reel is horizontal, causing a drag or binding on the rim of the reel where the reel is mounted on a fixed horizontal rotary axis. The same problem presents itself when the hose is being reeled in.

It is accordingly an important object of the present invention to facilitate and simplify reeling out and reeling in of hose with respect to especially reels of the water source connected type, that is, reels wherein a direct connection with the water source is effected through the axle structure for the reel.

Another object of the invention is to provide improved means to enable swinging of a direct fluid source connected reel of the character described in order to follow the direction of reeling out of the flexible strand-like member such as hose and subsequently reeling in of the member carried by the reel.

A further object is to provide an improved reel mount enabling slective swinging of the reel about a vertical axis while enable free reeling in and reeling out rotary movement of the reel on a horizontal axis and including novel means for locking the mount in a substantial range of swinging adjustments of the reel.

Still another object of the invention is to provide novel adjustment-retaining clutch structure in swingable hose reel mounts.

It is also an object of the invention to provide improved means in connection with a fluid connected reel for enabling reeling out and reeling in of hose on the reel in a wide directional range free from seizing or binding with respect to the rim of the reel.

Other objects, features and advantages of the present invention will be readily apparent from the following detailed description of certain preferred embodiments thereof taken in conjunction with the accompanying drawings, in which:

Figure 1 is a top sectional plan view of a garden hose reel and mount therefor embodying features of the invention;

Figure 2 is a side elevational view of the reel and mount;

Figure 3 is an enlarged fragmentary sectional detail view taken substantially on the line III—III of Figure 2;

Figure 4 is an enlarged fragmentary sectional detail view taken substantially on the line IV—IV of Figure 3;

Figure 5 is a side elevational view of a hose reel and a modified device for enabling free self-adjustable, non-seizing reeling out and reeling in of hose with respect to the reel;

Figure 6 is a sectional top plan view of the assembly of Figure 5; and

Figure 7 is a sectional perspective view showing a bracket arrangement for mounting the reel on an outside corner of a building.

In the form of the invention shown in Figures 1–4, a reel mount 10 according to the present invention carries a hose reel 11 adapted to have reeled thereon garden hose 12 which may have a nozzle 13 at a free end thereof while the opposite end is suitably detachably connected to a water connection 14 rigidly carried by core portion of the reel and forming part of an axle structure 15 for the reel enabling rotation of the reel about a horizontal axis for reeling out or reeling in the hose 12. A handle 17 on the reel adjacent to one rim thereof facilitates turning the reel about its horizontal axis.

In order to enable reeling out and reeling in of the hose 12 with respect to the reel 11 without seizing or binding upon the rim of the reel where the direction of the hose in moving relative to the turning reel is substantially angular to the plane of the reel parallel to its face and normal to the rotary axis of the reel, the reel mount 10 includes means for supporting the reel for swinging about a vertical axis. To this end, the reel mount includes a supporting bracket 18 having a base flange 19 arranged to be attached in a vertical plane as by means of screws 20 to a vertical wall or other supporting surface 21, such as a wall or part of a wall exteriorly of a dwelling or other type of building adjacent to a water faucet 22 preferably located conveniently somewhere below the location of the bracket 18 as mounted on the supporting structure 21.

Combination swivel support and fluid conducting means are provided for both swingably supporting the reel 11 on the bracket 18 and connecting the hose 12 to the water supply faucet 22. To this end, a tubular fluid conducting reel-carrying arm 23 is provided which is adapted normally to be disposed on a horizontal plane and has thereon an upstanding rigid cylindrical swivel journal member portion 24 swivelly disposed within a complementary vertical axis bearing sleeve 25 on and preferably integrally cast with the supporting bracket 18, as best seen in Figure 3. In a desirable construction, both the bracket 18 and the arm 23 inclusive of the journal portion 24 are adapted to be made as aluminum castings, although other materials may be used if preferred.

In keeping with the swingable mounting of the reel 11, the journal portion 24 is disposed on one extremity of the arm 23 while the opposite end of the arm has a preferably right angular terminal portion 27 providing a supporting bearing on which the journal structure 15 of the reel is rotatably mounted. Throughout its major extent, the arm 23 is parallel to the face plane of the reel 11 as best seen in Figure 1, and as close as practicable to the adjacent face plane of the reel so as to be accommodated in a minimum space between the adjacent face of the reel and the supporting wall structure 21 when the reel is collapsed or swung as close as practicable toward the wall 21. From this collapsed relationship to the wall, the reel is adapted to be swung out incrementally through an arc of about 135° adjustably conformable with selective changes in reeling out directions of the hose 12, two illustrative swung-out positions within such arc being indicated in dot dash outline in Figure 1. To compensate for the outwardly offset relation of the swivel axis of the supporting bracket sleeve 25 relative to the wall 21, the journal end portion of the arm 23 is preferably obliquely angled relative to the major extent of the arm 23 to provide an offsetting terminal portion 28 connected to the lower end of the journal portion 24.

For connection of the arm 23 to the faucet 22, a downwardly projecting tubular connecting extension 29 is provided as a coaxial projection from the lower end of the journal portion 24 on the contiguous terminus of the arm offsetting portion 28 and providing a duct passage 30 extending through the connecting extension 29 and the arm 23 inclusive of the reel-carrying terminal 27 and communicating with the reel-carried fluid connection 14 for the hose. A threaded counterbore 31 at the mouth of the connecting extension end of the passage 30 enables detachable connection as by means of a suitable fluid tight connector 32 (Fig. 2) on the end of a connecting duct 33 which may be a piece of flexible hose connected to the water faucet 22. A plug 34 may be provided to close an access opening into the arm portion of the flow passage 30 provided for coring out or other purposes.

By reason of the simple construction whereby the bracket 18 comprises one unitary component and the arm 23 inclusive of the journal projection 24 comprises a second unitary component, manufacture and assembly of the device are greatly facilitated. Loosely slidable projection of the journal portion 24 through the sleeve 25 substantially completes the assembly which is then maintained by retaining means attached to the upper free end portion of the journal member 24 and coacting with the upper end of the sleeve 25.

In the present instance, the journal carried retaining means comprises a bearing member 35 serving also as a clutch actuator. Advantageously, the member 35 is in the form of a circular disk freely rotatably mounted on a horizontal axis within an upwardly opening axial slot 37 which bifurcates the upper end portion of the journal 24 normally projecting upwardly above the upper end of the bearing sleeve 25. A pivot pin 38 connects the disk 35 pivotally between the upstanding bifurcation arms of the journal member and the disk member is of somewhat larger diameter than the diameter of the journal member 24 and preferably also larger than the outside diameter of the sleeve 25 so that a convexly transversely curved periphery 39 of the disk will slidably engage upon a flaring annular bearing surface 40 on the upper end of the bearing sleeve 25. Thereby, the perimeter 39 of the retaining disk provides a thrust bearing slidably engaging the opposing annular flaring thrust bearing 40 of the bearing sleeve enabling swivelling movement of the journal 24 within the bearing sleeve.

Inasmuch as especially for reeling in of the hose it is desirable that the reel be held against swinging out of the most efficient orientation relative to the extended hose to be reeled in by rotation of the reel 11 through the medium of the handle 17, clutch or locking means are provided for this purpose. Accordingly, the thrust bearing retaining disk 35 is mounted to act as a lifter for the journal 24 which is longitudinally reciprocable to engage or release an enlarged lower end multi-sided clutch collar 41 with respect to a complementary clutch skirt 42 on and opening downwardly from the lower end of the bearing sleeve 25. In a practical form, the clutch collar 41 has eight tapering clutch faces facing outwardly while the clutch collar 42 has an equal number of flaring internal faces. By having the connecting pivot pin 38 for the thrust disk 35 extending eccentrically through the disk as best seen in Figure 2, the thrust bearing disk becomes a lifting cam. Thus, where as shown in Figs. 1 and 2 the retaining cam disk 35 is in the position of maximum eccentricity, with a manipulating handle 43 thereon projecting upwardly, the journal 24 is in a depressed position, also indicated in dot dash outline in Figure 3 into which it is drawn gravitationally by the weight of the arm 23 and the reel 11. In this lowest or depressed position, the journal 24 is freely swivelly turnable in the bearing 25 for free swinging of the reel 11 about the axis of the swivel bearing support therefor.

When it is desired to latch or lock the reel against swinging out of any preferred swivel position, this is easily effected by turning the retaining cam bearing disk 35 by means of the handle 43 into a position of less eccentricity as indicated in dash outline in Figure 2 and in full outline in Figure 3 which causes the journal 24 to be drawn upwardly and thus draws the clutch collar 41 lockingly into the clutch skirt 42. In this latched position, the disk 35 is held by frictional resistance to sliding movement of the disk periphery 39 on the bearing surface 40 caused by the dead weight of the supported structure and in the final increment of clutching, latching thrust of the cam disk a tightening of the clutch faces and thus a tightening of the disk periphery onto the bearing surface 40. Nevertheless, there is sufficient leverage advantage in the handle 43 to effect easy release of the cam disk and turning thereof for declutching the assembly, as desired.

Where it is desirable to mount the reel for swinging toward either of divergent walls of a building the arrangement shown in Figure 7 is advantageous. For this purpose, a corner bracket structure comprising a pair of generally U-shape corner brackets 44 is provided on which the base flange 19 of the swivel bracket 18 is secured in suitable manner as by means of bolts 45. Each of the legs of each of the brackets 44 has an oblique angular wall engaging flange terminal 47 respectively engageable against and secured as by means of screws 48 to the adjacent marginal portions of the diverging building walls forming an outside corner 49. Through this arrangement, the bracket 18 is mounted directly opposite and in line with the corner 49, preferably in a plane bisecting the corner angle, so that the reel 11 may be swung through and about 270° arc from one side to the other side of the swivel bracket 18 and making the hose 12 available efficiently throughout such arc and at either side of the building defined by the diverging walls forming the corner 49. If preferred, the bracket 18 itself may be formed with corner-engageable legs.

Where for lack of room within which to swing the reel or for economy reasons, a simpler and less expensive reeling adjustment means is desired, the construction shown in Figures 5 and 6 may be utilized. In this form of the invention, the same reel 11 as shown in Figures 1 and 2 may be utilized, but in this instance mounted rotatably directly upon a water source control device such as a faucet structure 50 mounted fixedly upon a building wall 51, or the like. For adjustable orientation of the hose 12 throughout substantially the same adjustment arc as enabled by swinging of the reel 11 in the form of Figures 1 and 2, a rotary, swivel mounted hose guide member is provided in the form of a pulley 52 mounted on an arm 53 carried by a swivel bracket 54. For best results, the pulley should be, as shown, of a size to provide a rim groove substantially deeper and wider than the outside diameter of the hose 12 to resist unintentional escape of the hose trained thereover.

In order to attain as nearly as practicable the same directional adjustment orientation of the hose 12 as it is reeled out or reeled in relative to the reel 11 as obtained by the direct swinging of the reel as hereinbefore described, the pulley 52, the arm 53 and the bracket 54 as nearly as practicable simulate structurally and conform functionally to the reel 11, the arm 23 and the bracket 18, respectively, of Figures 1 and 2, but on a miniature scale and without the fluid duct function of the arm 23 or the clutch structure of the swivel mount for the arm 23. However, it will be observed that the pulley 52 serves as a guiding wheel for the hose 12 functionally equivalent to the guiding wheel operation of the reel 11 itself in Figures 1 and 2. The arm 53 supports the pulley 52 for swinging through an arc substantially the same as does the arm 23. The bracket 54 supports the arm 53 swivelly similarly as does the bracket 18 support the arm 23.

To attain this desirable result, the arm 53 is of generically similar shape as the arm 23, having a free end portion right angular horizontal axis journal terminal projection 55 on which the pulley 52 is rotatably mounted. On its opposite end portion, the arm 53 is provided with an angular oblique portion or section 57 having on its terminus a vertically extending journal extension 58 pivotally, swivelly rotatable in bearing structure 59 provided by spaced parallel horizontal arms of the swivel bracket 54. Spaced apart thrust bearing 60 on the journal portion 58 are slidably engageable with the opposing surface of the bearing structure 59.

For the most effective results, the adjustment guide pulley 52 should be mounted directly above the hose reel, substantially as shown, with the vertical axis of the journal 58 in a vertical plane through the rotary axis of the reel and at a sufficient height above the reel to enable free lead-off of the hose 12 from the reel onto the pulley 52. Although in this instance the journal 58 is shown as directed downwardly, thereby placing the bracket 54 closer to the reel, the journal may just as well project upwardly and with the bracket accordingly spaced a little further above the reel, as preferred. The relationship of the pulley rim groove perimeter is preferably such with respect to the reel drum or groove perimeter that in the opposite extremes of the swinging range of the pulley 52 its perimeter facing generally toward the bracket 54 will be close to a vertical line running up tangent to the underlying perimeter of the reel drum. This assures that the lead-off portion of the hose 12 will at all times tend to reasonably hug the groove perimeter of the pulley 52 over which it is trained, while the overlying portion of the hose on the pulley tends gravitationally to remain in the pulley groove. This relationship persists throughout the swinging range of the pulley 52, two exemplary positions in such range being shown in Figure 6 in full and dot dash outlines.

While the bracket 54 is shown in a form readily adapted to be formed up from suitable heavy gauge strip metal so that the base flange or web thereof can be secured to the wall 51 by suitable means such as screws or the like, the bracket may, if preferred, be made as a forging or casting along the lines of the bracket 18, although that would be a more expensive form.

It will be understood that modifications and variations may be effected without departing from the scope of the novel concepts of the present invention.

I claim as my invention:

1. In a construction of the character described, a swingable reel supporting arm, an upstanding journal on said arm, a bracket having a vertical bearing swivelly supporting said journal and means for securing the bracket to a vertical supporting structure, the upper end portion of the journal projecting normally above the upper end portion of the bearing, and a thrust bearing structure on the upwardly projecting upper end portion of the journal engaging a generally upwardly facing bearing at the upper end of said bracket bearing, said thrust bearing on the journal comprising a disk member eccentrically mounted on a horizontal axis and having a periphery projecting laterally from the journal and engageable with said upwardly facing bracket bearing.

2. In a construction of the character described, a swingable reel supporting arm, an upstanding journal on said arm, a bracket having a vertical bearing swivelly supporting said journal and means for securing the bracket to a vertical supporting structure, the upper end portion of the journal projecting normally above the upper end portion of the bearing, and a thrust bearing structure on the upwardly projecting upper end portion of the journal engaging a generally upwardly facing bearing at the upper end of said bracket bearing, said upper upwardly projecting end portion of the journal being slotted and thus bifurcated and said bearing carried thereby comprising a disk eccentrically mounted on a rotary axis in said slot between the bifurcations of the journal upper end portion and having a periphery projecting beyond the journal and engageable with said upwardly facing bearing.

3. In a construction of the character described, a swingable reel having a supporting arm, an upstanding journal on said arm, a bracket having a vertical bearing swivelly supporting said journal and means for securing the bracket to a vertical supporting structure, the upper end portion of the journal projecting normally above the upper end portion of the bearing, and a thrust bearing structure on the upwardly projecting upper end portion of the journal engaging a generally upwardly facing bearing at the upper end of said bracket bearing, said upper upwardly projecting end portion of the journal being slotted and thus bifurcated and said bearing carried thereby comprising a disk mounted on a rotary axis in said slot between the bifurcations of the journal upper end portion and having a periphery projecting beyond the journal and engageable with said upwardly facing bearing, said disk having its pivotal axis eccentric and thereby affording a rotary cam action for the disk enabling raising and lowering of the journal in said vertical bearing and corresponding raising and lowering of the arm and the reel.

4. In a construction of the character described, a swingable reel having a supporting arm, an upstanding journal on said arm, a bracket having a vertical bearing swivelly supporting said journal and means for securing the bracket to a vertical supporting structure, the upper end portion of the journal projecting normally above the upper end portion of the bearing, and a thrust bearing structure on the upwardly projecting upper end portion of the journal engaging a generally upwardly facing bearing at the upper end of said bracket bearing, said upper upwardly projecting end portion of the journal being slotted and thus bifurcated and said bearing carried thereby comprising a disk mounted on a rotary axis in said slot between the bifurcations of the journal upper end portion and having a periphery projecting beyond the journal and engageable with said upwardly facing bearing, said disk having its pivotal axis eccentric and thereby affording a rotary cam action for the disk enabling raising and lowering of the journal in said vertical bearing and corresponding raising and lowering of the arm and the reel, said journal and the lower end portion of said vertical bearing having releasable clutch means releasable by lowering of the journal and engageable by raising of the journal through the medium of said bearing cam disk.

References Cited in the file of this patent

UNITED STATES PATENTS

| 238,153 | Piper | Feb. 22, 1881 |
| 449,033 | Bowers | Mar. 24, 1891 |
| 1,531,949 | Johnson | Mar. 31, 1925 |
| 1,726,084 | Montgomery | Aug. 27, 1929 |
| 2,053,654 | Davis | Sept. 8, 1936 |
| 2,805,100 | Shaver | Sept. 3, 1957 |

FOREIGN PATENTS

| 331,238 | Great Britain | June 26, 1930 |